(12) United States Patent
Shinoda

(10) Patent No.: US 6,383,046 B2
(45) Date of Patent: May 7, 2002

(54) GLASS BULB FOR A CATHODE RAY TUBE AND A METHOD FOR PRODUCING A CATHODE RAY TUBE

(75) Inventor: Masayuki Shinoda, Funabashi (JP)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/734,175

(22) Filed: Dec. 12, 2000

Related U.S. Application Data

(62) Division of application No. 09/323,830, filed on Jun. 2, 1999, now Pat. No. 6,227,394.

(30) Foreign Application Priority Data

Jun. 9, 1998  (JP) .......................................... 10-161102

(51) Int. Cl.$^7$ ................................................. H01J 9/00
(52) U.S. Cl. .......................................................... 445/3
(58) Field of Search ....................................... 445/45, 3

(56) References Cited

U.S. PATENT DOCUMENTS

| 4,374,451 A | * | 2/1983 | Miller ......................... 445/45 |
| 5,019,004 A | * | 5/1991 | Steiner et al. ................ 445/45 |
| 5,733,711 A | * | 3/1998 | Juengling ................... 430/312 |

* cited by examiner

Primary Examiner—Kenneth J. Ramsey
(74) Attorney, Agent, or Firm—Oblon, Spivak, McClelland, Maier & Neustadt, P.C.

(57) ABSTRACT

Manufacturing steps for a cathode ray tube or a glass bulb for the cathode ray tube are controlled in such a manner that a two-dimensional matrix code 3 comprised of a plurality of dots is marked by laser in an outer side surface of a glass bulb 1, 5, the two-dimensional matrix code 3 containing the information which can identify individually glass bulbs, and the manufacturing steps are conducted by using a computer and the particulars specified by the serial information.

7 Claims, 7 Drawing Sheets

F I G . 3
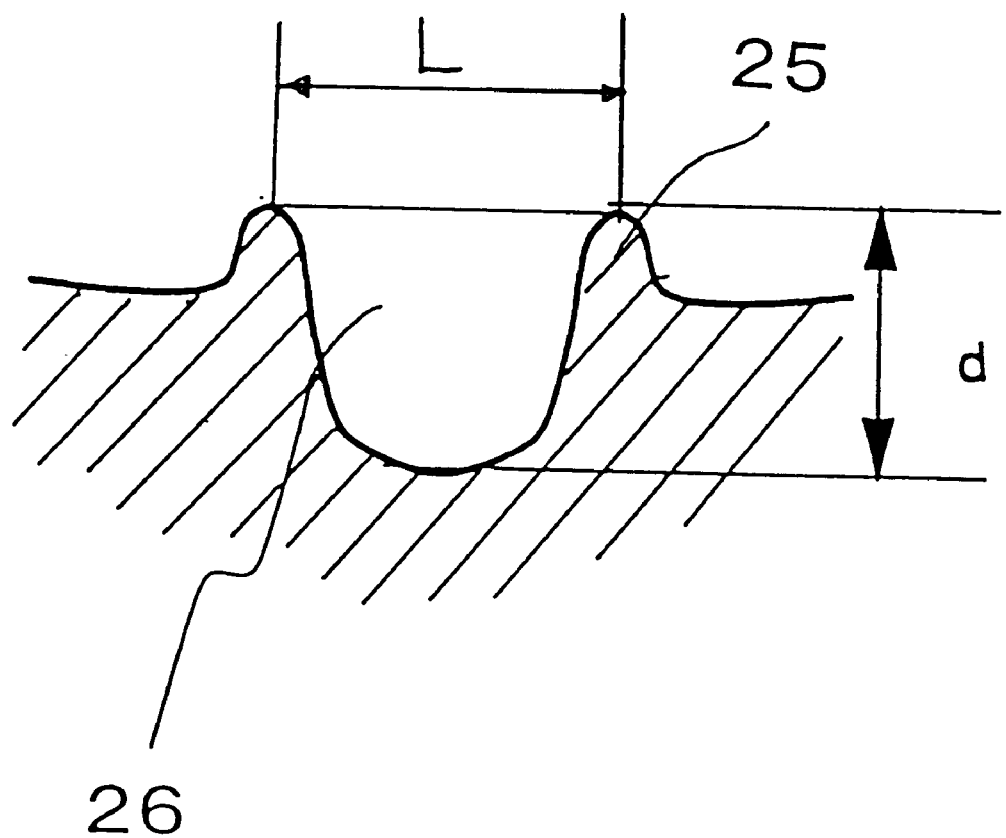

GLASS BULB FOR A CATHODE RAY TUBE AND A METHOD FOR PRODUCING A CATHODE RAY TUBE

This application is a division of 09/323,830 filed Jun. 2, 1999 now U.S. Pat. No. 6,227,394.

BACKGROUND OF THE INVENTION

1. Field of the Invention

The present invention relates to a glass bulb for a cathode ray tube having a two-dimensional matrix code comprised of a plurality of dots in a predetermined portion of an outer side surface of the glass bulb, a method for producing such glass bulb and a method for producing a cathode ray tube using such glass bulb.

2. Discussion of the Background

There has been known a technique that information on the glass bulb or information on operating conditions (including information on the particulars of operations) is directly written as marked characters or a code in an outer side surface of a glass bulb for a cathode ray tube (hereinbelow, referred to as a glass bulb), and manufacturing steps for the glass bulb are controlled based on the information read. Generally, the writing of such information in the outer side surface of the glass bulb is conducted by directly printing a heat-resistant material or attaching a heat-resistant label, or marking by sand-blasting or laser.

For example, JP-A-2-87442 proposes a method for controlling manufacturing procedure wherein a bar code is marked by using a $CO_2$ gas laser masking method and the bar code is read whereby a mistake in combining parts of a cathode ray tube, which may take place in manufacturing, can be prevented. Further, such a technique that the particulars of a product manufactured can be obtained from characters marked by laser is also known from JP-U-63-20251.

However, the conventional techniques using printing or laser masking to write the characters or the code had a problem that all required information had to be separately given to individual products. For example, in the laser masking method, since laser beams had to be passed through a mask to write information, it was impossible to change the particulars of information without changing the mask. Accordingly, it was difficult to write information for a relatively short time for a large quantity of glass bulbs conveyed during manufacturing steps.

In the conventional technique, there was a quantitative restriction on information to be written in by means of characters and a bar code. Accordingly, information inherent to the glass bulb such as the kind (size), the transmittance of the glass bulb, application or non-application to an anti-reflection treatment, a manufacture line used and so on and information on operating conditions have been given to a large number of products which were grouped for controlling in mass production. That is, the conventional techniques are inappropriate as an information means to identify a large number of glass bulbs.

Heretofore, conventional characters or a bar code marked by laser on the outer side surface of glass bulbs by a glass bulb manufacturer are insufficient for a cathode ray tube manufacturer to utilize the information written by the glass bulb manufacturer. Accordingly, the cathode ray tube manufacturer has written its own information by means of characters or a bar code so that manufacturing steps can be controlled. That is, glass bulb manufacturers and cathode ray tube manufacturers have not used common characters or a bar code.

There has been known a general technique of using a laser to mark characters or bar codes on glass products. However, there has not been proposed such a technique that characters or the like including a large amount of information which can identify individually glass bulbs are marked on the surface of a glass product such as a glass bulb which is transparent, does not have a flat surface and has a mat-surface-like fine recesses and projections, and the information marked therein can be read by means of a pick-up device.

Further, in the steps of producing panels and funnels in the glass bulb manufacturers, there are a variety of combinations among a processing line, a mold, a forming machine, a hot processing machine and so on. Accordingly, if a trouble or a defective product takes place in a step of producing, it takes much time to trace the cause, and on the other hand, an appropriate way of resolution has not been proposed.

Further, there is a problem in manufacturing steps for the glass bulb such that, for example, it is difficult to supply products manufactured by the same mold or the same machine in a forming or hot processing step, in the intentionally optimum combination, to the next polishing step at which there are a large number of lines for polishing. This difficulty is applicable also to cathode ray tube manufacturers.

In short, due to restrictions to an amount of information to be written in and difficulty in writing the characters and so on for glass bulbs, there is a limit in using the characters or codes in manufacturing steps in each of the glass bulb manufacturers and cathode ray tube manufacturers. Thus, there has not been known a method for producing a glass bulb or a cathode ray tube wherein marked characters or codes can be used commonly for both manufacturers, to make it unnecessary for the cathode ray tube manufacturer to use its own characters or codes.

On the other hand, there has recently been an increased spread of using bar codes and needs for coding a greater amount of information and putting information in a smaller space. In response to this, a two-dimensional matrix code has been known. The two-dimensional matrix code is a code system wherein information is written in both directions of longitudinal and lateral, i.e., two-dimensional directions. However, the application of the two-dimensional matrix code, in particular, a two-dimensional matrix code comprised of a plurality of dots, to a glass bulb has not been studied. Further, a technique of identifying glass bulbs by using the two-dimensional matrix code comprised of a plurality of dots, and a technique of controlling manufacturing steps for glass bulbs or cathode ray tubes based on the information of the two-dimensional matrix code marked in the glass bulbs, have not been known.

SUMMARY OF THE INVENTION

It is an object of the present invention to provide a glass bulb wherein a two-dimensional matrix code comprised of a plurality of dots which is usable commonly for a glass bulb manufacturer and a cathode ray tube manufacturer is marked in a predetermined portion of an outer side surface of the glass bulb and which is capable of writing information capable of identifying individually glass bulbs, and a method for producing a glass bulb or a cathode ray tube, wherein manufacturing steps are controlled by using the two-dimensional matrix code.

In accordance with the present invention, there is provided a glass bulb for a cathode ray tube which has an outer side surface in which a two-dimensional matrix code comprised of a plurality of dots marked by laser is formed, wherein each dot has a recess having a depth of 5–100 μm and a diameter of 50–400 μm.

Further, in accordance with the present invention, there is provided a method for producing a glass bulb for a cathode ray tube which comprises a step of marking by laser a two-dimensional matrix code comprised of a plurality of dots in an outer side surface of a glass bulb, which is in a state of being heated at 200–500° C. after having been formed, a step of reading information contained in the two-dimensional matrix code, and a step of controlling processing operations after the forming of the glass bulb based on the read information, wherein the two-dimensional matrix code includes at least the information which can identify individually glass bulbs for cathode ray tubes.

Further, in accordance with the present invention, there is provided a method for producing a cathode ray tube which comprises a step of identifying a glass bulb for a cathode ray tube by reading a two-dimensional matrix code comprised of a plurality of dots formed in an outer side surface of the glass bulb, a step of determining by a control device at least desirable operating conditions for the identified glass bulb in response to the information inherent to the identified glass bulb, a step of reading sequentially the two-dimensional matrix code in manufacturing steps to extract information for desirable operating conditions determined for the glass bulb from the control device, and a step of conducting operations instructed by the control device, wherein the two-dimensional matrix code includes at least the information which can identify individually glass bulbs for cathode ray tubes, and a part or all of the manufacturing steps are controlled on the basis of the information.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is an enlarged cross-sectional view showing a dot formed by laser;

DESCRIPTION OF THE PREFERRED EMBODIMENTS

Figure 1:
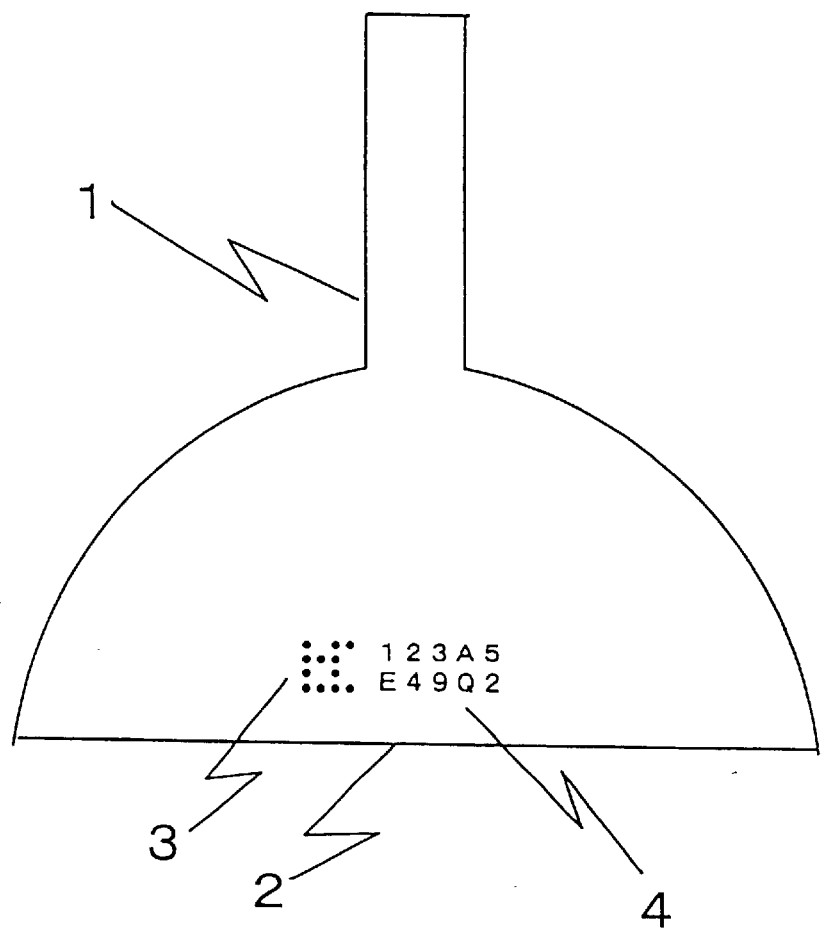
FIG. 1 is a front view of a funnel in which a two-dimensional matrix code is marked as an example.

The present invention will be described in more detail.

In the present invention, a two-dimensional matrix code comprised of a plurality of dots is marked in a predetermined portion of an outer side surface of a glass bulb for a cathode ray tube. In this text, the glass bulb designates a panel for a color cathode ray tube (hereinbelow, referred to as a panel), a funnel for a color cathode ray tube (hereinbelow, referred to as a funnel), a glass bulb for a monochrome cathode ray tube, or a glass bulb for a projection tube. In a case of the panel and the funnel, a two-dimensional matrix code is usually marked to each of them. However, the marking may be conducted to either one.

The two-dimensional matrix code in the present invention is formed by arranging a plurality of dots in a two-dimensional direction, i.e., longitudinal and lateral directions. The basics of the two-dimensional matrix code will not be described in detail because it is substantially the same as one conventionally known. However, the present invention is featurized by specifying information by the positional arrangement of dots. An amount of information of the two-dimensional matrix code can properly be adjusted by increasing or decreasing the number of dots and the arrangement of the dots.

The shape of each of the dots which forms the two-dimensional matrix code does not intend the thickness of line as for a so-called bar code, but can be recognized as a point of circular or elliptic shape. Use of a circular shape is generally preferable. In marking the two-dimensional matrix code in a form of arranging dots, a matrix style such as a data matrix, veri code matrix or the like is generally utilized. However, another style may be employed as far as the two-dimensional matrix-code can be formed by dots.

In the present invention, when the two-dimensional matrix code is marked by dots as recesses in an outer side surface of the glass bulb, use of a laser is in particular preferable. The main reason is as follows. Even though there are fine recesses and projections on the glass bulb at the portion to be marked by the laser, the laser can mark correctly and quickly dots so that they can be read by a sensor in an automatic way provided that the recesses of the dots are appropriately formed.

Further, the two-dimensional matrix code marked in the outer side surface of the glass bulb after having been formed should withstand chemically and physically to any treatment in the subsequent manufacturing steps for the glass bulb or the cathode ray tube. In particular, since the glass bulb undergoes a heat treatment at a high temperature of about 440° C. in manufacturing steps for the cathode ray tube, it has to withstand heat. Marks formed by a laser can satisfy substantially all requirements described above.

In the-following, several embodiments of the present invention will be described with reference to the drawings.

Each dot forming a two-dimensional matrix code marked by laser in a glass bulb is formed as a recess 26 of circular or substantially circular shape in a glass surface as shown in FIG. 3. In FIG. 3, L designates the diameter of the recess 26, and d designates the depth. An annular projection 25 is generally formed around the recess 26. The depth d of the recess 26 in the case when the projection 25 is formed is measured from the top of the projection 25. The shape of the inner surface of the recess 26 is not in particular limited. However, when a laser is used to glass to mark a dot, the shape as shown in FIG. 3 is generally formed.

Figure 4:
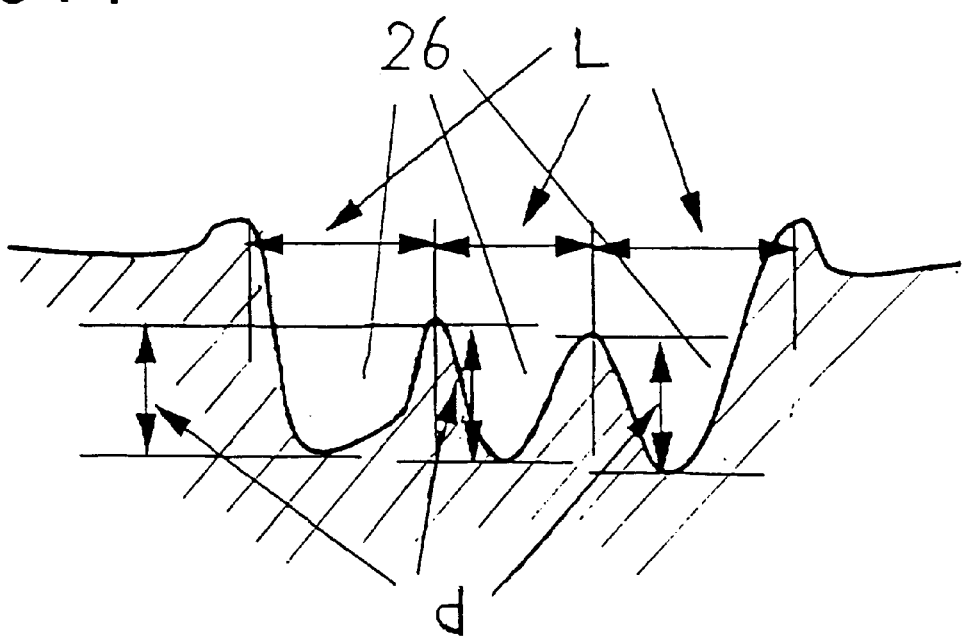
FIG. 4 is an enlarged cross-sectional view showing a variant dot formed by laser.

FIG. 4 shows another embodiment of the matrix code which is composed of a plurality of consecutive recesses 26. The recesses 26 shown in FIG. 4 are formed so that adjoining recesses 26 are partly connected when the depth d of each recess 26 becomes larger with respect to a pitch between adjacent recesses. The diameter L and the depth d of each of the recesses 26 in this case are measured as shown in FIG. 4. Generally, each of the recesses 26 is formed as a dot of substantially circular shape. However, when it is not circular, the maximum diameter is used.

In order to read correctly the two-dimensional matrix code, it is necessary to control the depth d and the diameter L of each of the recesses 26 to have predetermined dimensions. The reading of the two-dimensional matrix code is influenced by the performance of a reading device, the size (diameter) of dots, surface appearance of the portion to be marked by laser and so on. In generally used glass bulbs, the depth d is preferably 5–100 $\mu$m, more preferably, 10–50 $\mu$m. Further, the diameter L is preferably 50–400 $\mu$m, more preferably, 90–250 $\mu$m. Generally, when the depth d is smaller, the diameter L also becomes smaller. Accordingly, when the depth d is less than 5 $\mu$m, the diameter L is also less than 50 $\mu$m, which causes difficulty in reading correctly the two-dimensional matrix code.

On the other hand, when d and L exceed 100 $\mu$m and 400 $\mu$m respectively, there will arise cause problems that the marking by laser becomes difficult and fine cracks are formed around the recess 26. Further, the formation of a recess having an excessive size will cause strength reduction and the glass bulb is destroyed when a stress of vacuum is applied thereto. The annular projection 25 formed around the recess 26 is projected from the level of glass surface to increase the depth whereby the intensity of light and darkness of a reflection light from the dot is increased so as to provide easy detection.

Further, it is preferable for the recesses 26 as the dots for forming the two-dimensional matrix code to have a ratio of depth d/diameter L of 0.04–0.60, in particular, 0.09–0.35. Any recess 26 having d/L less than 0.04 will have a small recess portion and is not optically conspicuous. Accordingly, when the two-dimensional matrix code is to be read, light and darkness provided by any dot can not sufficiently be obtained whereby it is difficult to recognize the dot correctly. In particular, the case is remarkable in a glass bulb, because the surface 28 of the glass bulb is generally not a mirrored surface but has minute recesses and projections.

On the other hand, when any recess has d/L larger than 0.60, the shape of the recess is acute whereby fine cracks are resulted around the recess. Since the recesses are acute and relatively deep, the strength of the glass bulb becomes small. As a result, a cathode ray tube using such glass bulb is apt to be broken due to the acute recesses.

The surface of the glass bulb in which marking is conducted should be as smooth as possible regardless of a marking technique used. However, when marking is made by laser, the presence of fine recesses and projections in the surface to be marked is allowed within the range as described below. Namely, it is possible that the surface of glass bulb has minute recesses and projections where marking is made so that when light is irradiated from an angular direction of 5–85° with respect to a normal line to that surface, the S/N ratio of the intensity of contrast between light and darkness provided by the minute recesses and projections to the intensity of contrast between light and darkness provided by a dot in the two-dimensional matrix code marked in that surface is at least 1.5. When the S/N ratio is smaller than 1.5, the reading of the two-dimensional matrix code becomes difficult.

In a preferred embodiment of the present invention, the surface of the glass bulb in which marking is made should be smooth so as to have locally a mirrored surface or a nearly mirrored surface, whereby the influence of the surface roughness of the surface where marking is made can be eliminated or can be minimized. Such a smoothed surface can easily be obtained by processing the surface of a mold used or a polishing treatment after the forming.

The position of the surface of the glass bulb in which the two-dimensional matrix code is marked is not in particular limited. However, a location in a central portion of a longer side of the glass bulb and near the sealing edge is generally selected as the optimum position in consideration of the easiness of marking and reading as well as its having flatness in the outer side surface of the glass bulb. Further, in order to improve the flatness of the surface to be marked, a flat or substantially flat bed portion as a mound or a sunken spot (or sink) may be provided at the portion of the glass bulb to be marked. Further, in order to smooth the top surface of the mound or the bottomed surface of the sink, it may be finished to be a mirrored surface.

Description will be made as to information written in the two-dimensional matrix code. The two-dimensional matrix code used in the present invention includes a specific information such as the information which specifies the glass composition, the type, the size, the wall thickness, the date of manufacture, the arrangement of parts, the dimensions of product and the information which can identify individually glass bulbs or cathode ray tubes, and information on processing such as a processing line, processing operations, processing conditions in manufacturing steps for glass bulbs or cathode ray tubes. In the most preferable embodiment of the two-dimensional matrix code, it has information capable of at least specifying individually glass bulbs, i.e., a serial information.

By means of the serial information, each glass bulb is provided with, for example, an identification number. Accordingly, each glass bulb can clearly be distinguished from others in manufacturing steps for glass bulb s or cathode ray tubes. As a result, when the identification number is made correspondent to a control device such as a computer, the inherent information of a glass bulb such as the size, the wall thickness, the date of manufacture, the glass composition, the mold used for forming, the application or non-application of surface treatment and/or information on processing such as processing line, processing-operations, processing conditions and so on in manufacturing steps for the glass bulb or them cathode ray tube can properly be taken from the control unit so that the manufacturing steps can be controlled with use of the serial information.

For example, in a case that a glass bulb manufacturer supplies a serial information including a dimensional information on a glass bulb to a cathode ray tube manufacturer, the cathode ray tube manufacturer can read the supplied information during manufacturing steps for a cathode ray tube so that the cathode r ay tube can be assembled by utilizing the dimensional information. As a result, the quality of the cathode ray tub e and yield for the tube can be imp roved.

In this case, a part or all of the inherent information excluding the serial information and the information on processing for glass bulbs may be inputted to an appropriate recording medium so as to correspond to the serial information, and the information recorded in the recording medium may be taken out on the basis of the serial information marked in the glass bulbs.

There is another example of marking the two-dimensional matrix code. Namely, at least a part of the above-mentioned inherent information and the information on processing are incorporated along with the serial information in a single two-dimensional matrix code. According to this technique, the information on the glass bulb can be taken out and utilized at any time when the two-dimensional matrix code is read. Further, the two-dimensional matrix code and characters and/or figures which show the content of the information of the code may be marked together so that the inherent information in the two-dimensional matrix code can be confirmed by eyes. The characters and figures which correspond to the two-dimensional matrix code may previously be inputted in a laser print machine for marking two-dimensional matrix codes. Then, the characters and figures can be marked at the same time of marking a two-dimensional matrix code without requiring a special equipment.

The present invention is applicable not only to a glass bulb but also a glass product such as a window glass for automobile, a glass substrate for a TFT display and so on.

EXAMPLE

An example of the present invention will be described with reference to the drawings.

FIG. 1 is a diagram showing a funnel 1 having an outer side surface in which a data matrix type two-dimensional matrix code 3 and characters and figures (hereinbelow, referred to as characters) 4 representing an inherent information on the funnel, which is incorporated in the two-dimensional matrix code are marked by laser at a position 20 mm higher than the edge surface 2 to be sealed and a central portion of a longer side of the funnel. A serial information for identifying the funnel is incorporated in the two-dimensional matrix code comprised of a plurality of dots. The size of the two-dimensional matrix code 3 is 6 mm square, the depth of each dot is about 20 $\mu$m and the diameter is about 150 $\mu$m.

Figure 2:
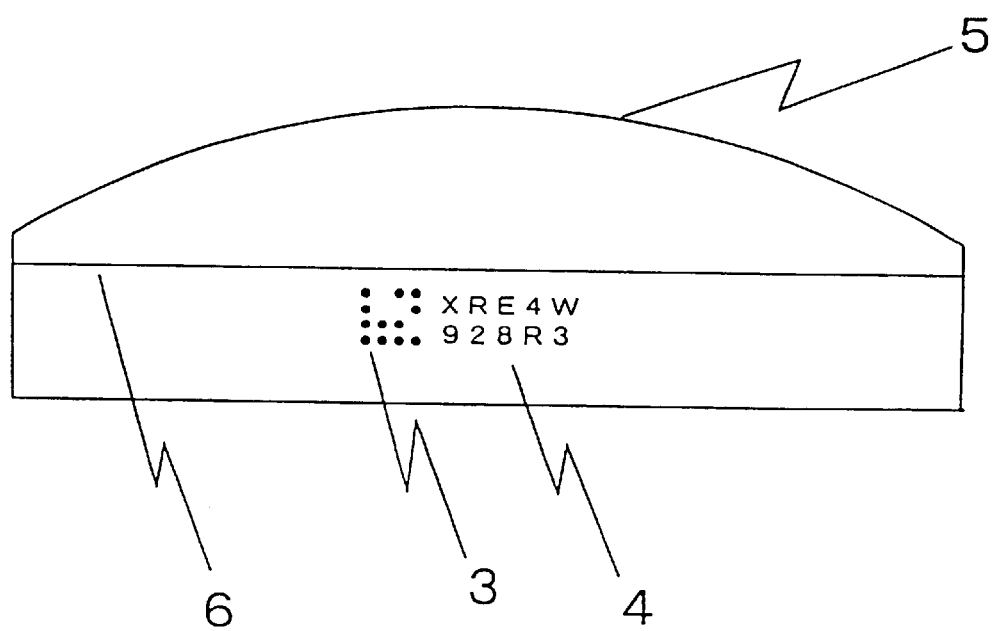
FIG. 2 is a front view of a panel in which a two-dimensional matrix code is marked as an example.

FIG. 2 is a diagram showing a panel 5 in which a data matrix type two-dimensional matrix code 3 and characters 4 are marked, in the same manner as the funnel 1 in FIG. 1, at a position 30 mm apart from a mold match portion 6 in a central portion of a longer side of the panel. The size of the two-dimensional matrix code 3, the depth and the diameter of each dot are the same as those of the funnel 1. On the dots of the panel or the funnel, the ratio of depth/diameter was 0.15.

Figure 5:
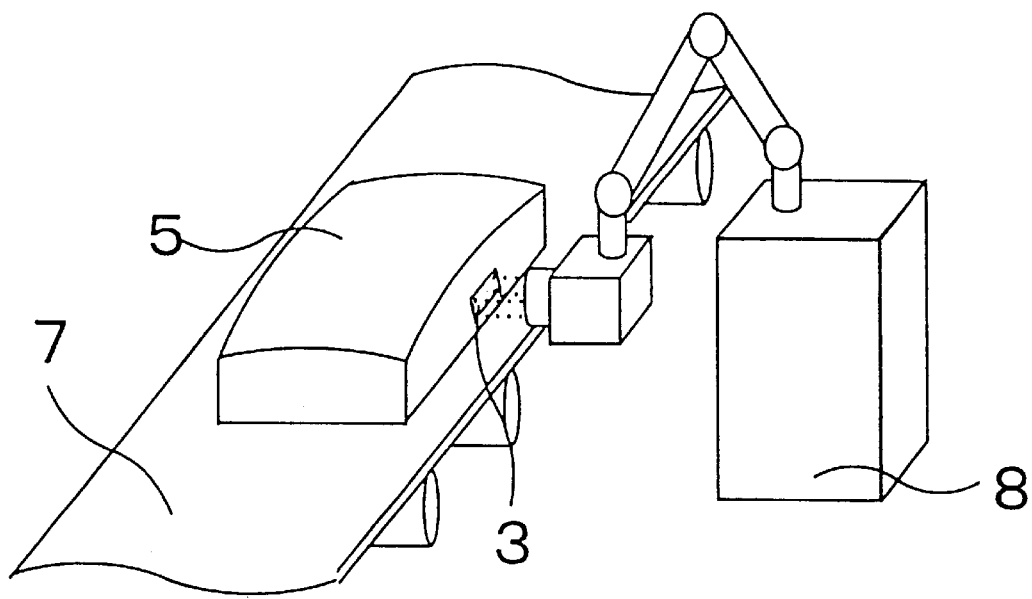
FIG. 5 is a perspective view partly broken of an embodiment of a marking apparatus for marking a two-dimensional matrix code by laser.

FIG. 5 is a diagram showing a two-dimensional matrix code marking apparatus for marking the two-dimensional matrix code 3 in the panel 5.

Molten glass is formed in a forming device (not shown) into the panel 5. The panel 5 was transferred on a conveyer to the next step, during which a two-dimensional matrix code 3 was marked at the same position as in FIG. 2 by means of a laser marking device 8 in a state that surface temperature was about 380° C. Two-dimensional matrix codes were marked successively to 50 panels 5 by the device, and there no cracks were found in dots for the two-dimensional matrix codes.

Figure 6:
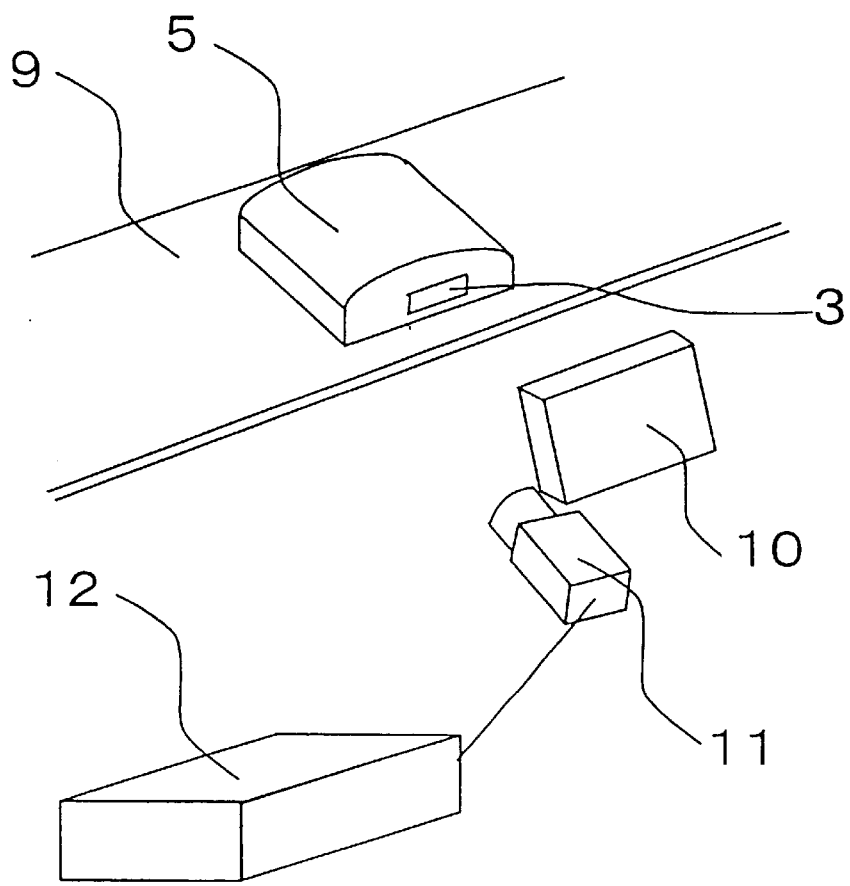
FIG. 6 is a perspective view partly broken of an embodiment of a reading apparatus for reading a two-dimensional matrix code marked by laser.
Figure 7:
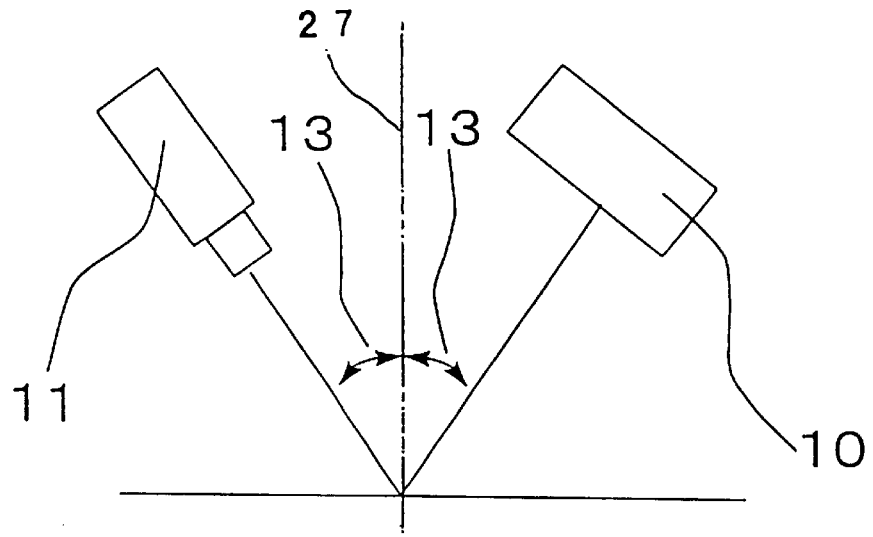
FIG. 7 is a diagram showing the relation between an incident light and a reflection light in the reading apparatus.

Each of the panels 5 with the two-dimensional matrix code was transferred to a reading device shown in FIG. 6. The two-dimensional matrix code was read on a conveyer 9 by means of a CCD camera 11 as an image pick-up device, and the read data were decoded by an image processing device 12. In this case, the angle of a diffusion light source 10 (an angle 13 to a normal line 27 in FIG. 7) was determined to 30°. As a result, the two-dimensional matrix code of all 50 panels could correctly be read, and it was confirmed that each of the panels could be identified by the serial information put in the two-dimensional matrix code 3.

In the next, description will be made as to an example of treating panels in a glass bulb manufacturer.

Figure 8:
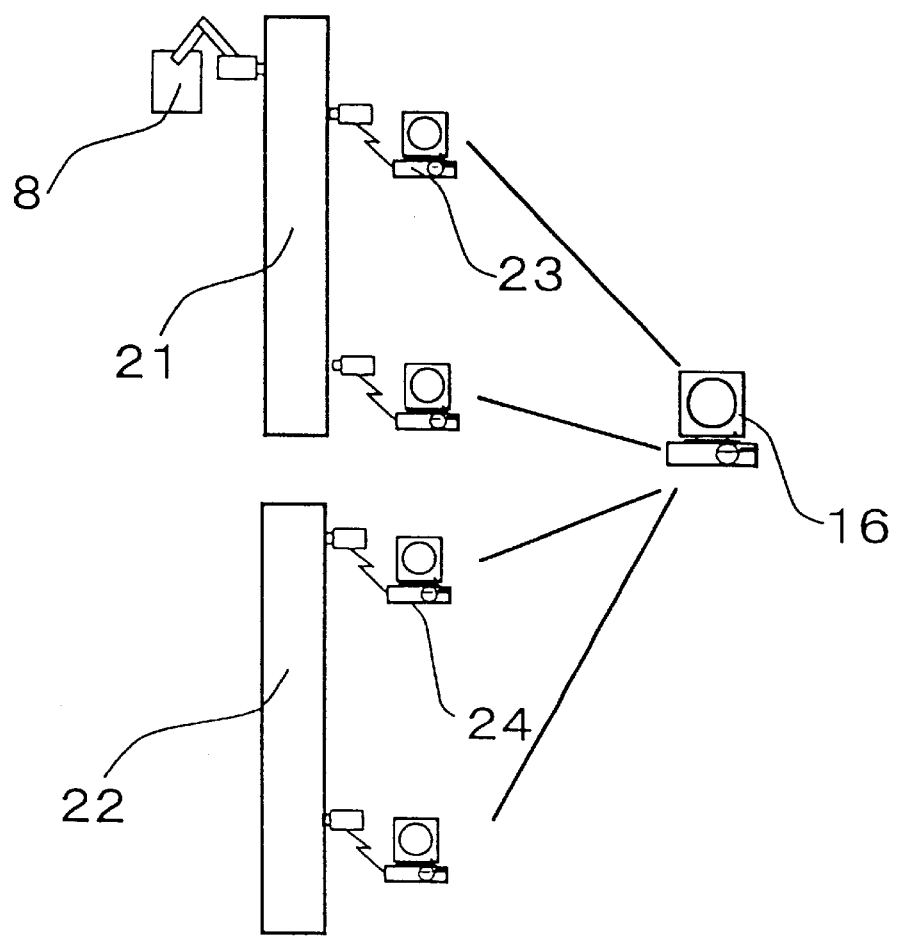
FIG. 8 is a diagram showing an example of utilizing a two-dimensional matrix code in a glass bulb manufacturer.

FIG. 8 is a diagram showing a case of using panels. Two-dimensional matrix codes are marked to panels (not shown) after having been formed, in a state that surface temperature is about 380° C., by using the laser marking device 8. Then, the two-dimensional matrix code reading device is set for each step of processing, polishing, inspecting and packaging for the panels. In FIG. 8, reading devices 23 are set for a processing step 21 and reading devices 24 are set for a polishing step 22 respectively. In this case, a host computer 16 is operated so as to correspond the number of processing machines or the polishing machines to the panels.

At the final stage of packaging a panel, the history of processing of the panel can be obtained by inquiring to the host computer 16 on the basis of the identification number of the panel which is provided by the two-dimensional matrix code. If there arises any trouble on a product, the cause of the trouble can quickly be obtained by examining the two-dimensional matrix code given to the product. Accordingly, the yield of manufacture can be improved. The above-mentioned way of using the two-dimensional matrix code is applicable to the funnel.

Figure 9:
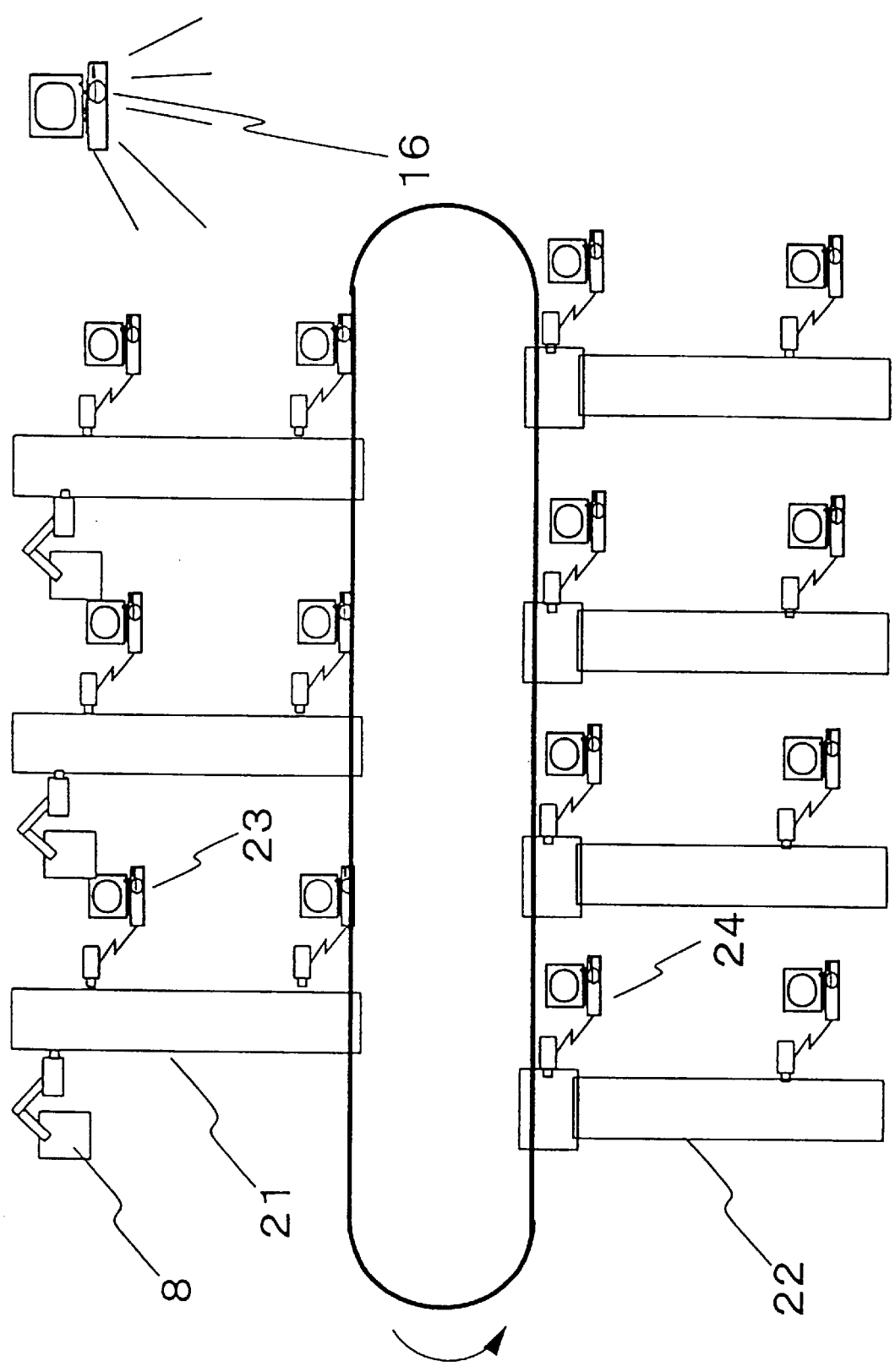
FIG. 9 is a diagram showing another embodiment of utilizing a two-dimensional matrix code in a glass bulb manufacturer.

FIG. 9 is a diagram showing another example of treating panels in the glass bulb manufacturer. Two-dimensional matrix codes are marked to panels after having been formed in a state that surface temperature is about 380° C. by using the laser marking devices 8. Reading devices 23 each provided for each processing step 21 read the two-dimensional matrix code of each panel so that the two-dimensional matrix code is made related to the machine used for processing the panel, the mold used for pressing the panel, in the host computer 16. Each of the panels with the two-dimensional matrix code is successively supplied from the processing step to a polishing step 22 as the next step.

FIG. 9 shows an embodiment of a processing apparatus wherein there are three lines for processing step 21 and four lines for polishing step 22. The reference numerals are given for only each line. When panels are'sent to polishing steps 22, a reading device 24 installed in each of the polishing steps 22 reads the two-dimensional matrix code marked in each of the panels. For example, a panel having a type most suitable to a certain polishing step or produced by a mold or a processing machine most suitable to the certain polishing step is checked and selected in the host computer 16, and the panel is selectively fed to a related polishing line.

Thus, since glass bulbs (panels, or funnels) can be produced in the optimum combination of manufacturing devices, yield for manufacturing can be increased, and the conventional operations wherein the glass bulbs have been confirmed by human eyes to select polishing lines can be eliminated. Further, the number of transferring equipments for connecting the processing steps to the polishing steps can be reduced.

The above-mentioned is an example of a combination of the processing step and the polishing step. However, substantially the same description is applicable also to the steps in combination of forming and processing, polishing and inspecting, inspecting and packaging and so on. Further, the application to the funnels is also possible.

Figure 10:
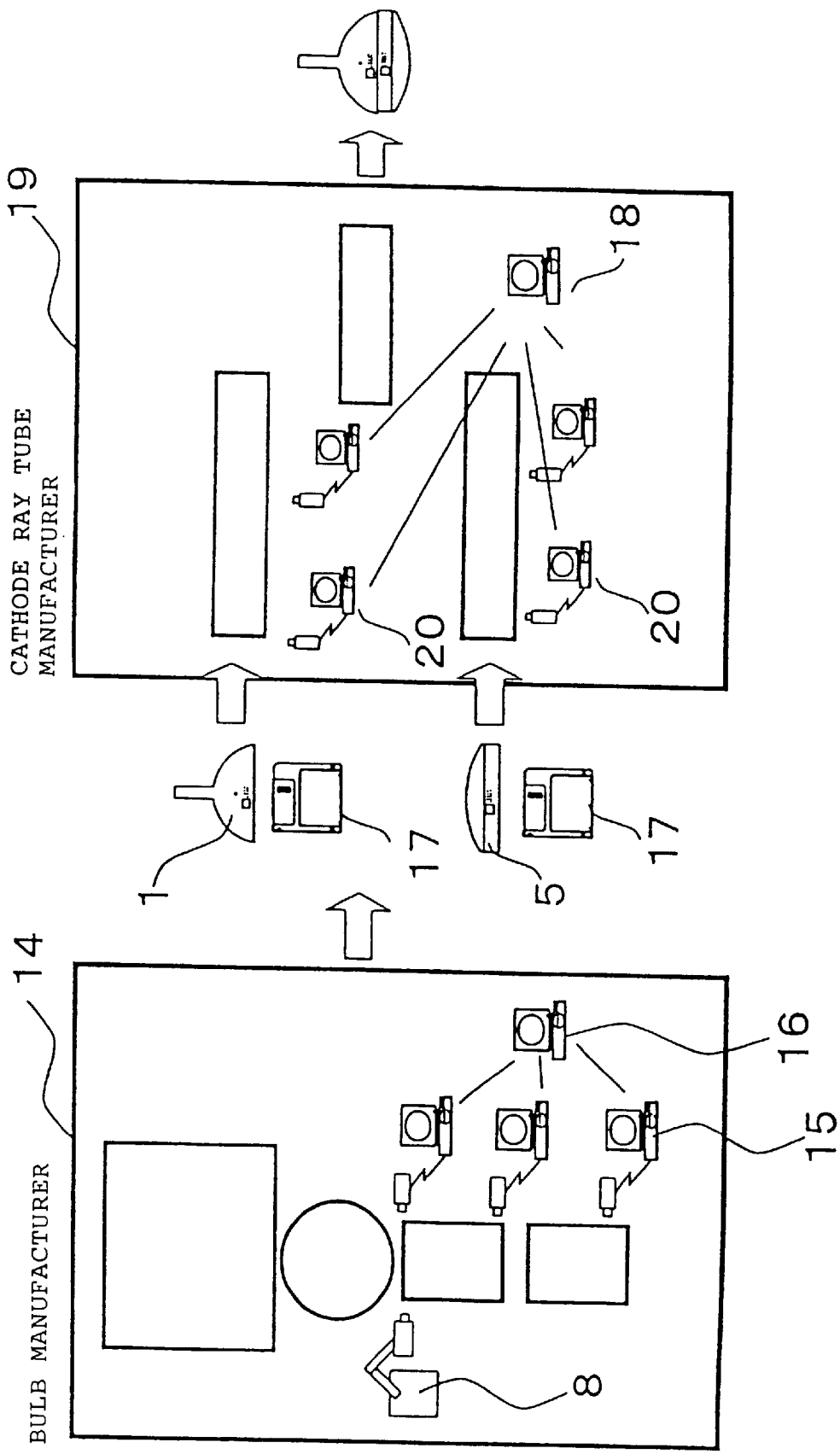
FIG. 10 is a diagram showing an embodiment of utilizing a two-dimensional matrix code in both the glass bulb manufacturer and a cathode ray tube manufacturer.

FIG. 10 shows an embodiment of utilizing two-dimensional matrix codes marked in glass bulbs (panels or funnels) by the present invention, which can commonly be used by a glass bulb manufacturer 14 and a cathode ray tube manufacturer 19. The glass bulb manufacturer 14 marks by using a laser marking device 8 a two-dimensional matrix code 3 which contains information inherent to a glass bulb such as the date of production, the glass composition,.the characteristics of the product and so on and a serial information for identifying individually glass bulbs and characters 4 representing the inherent information (v. FIGS. 1 and 2).

When the panels 5 and the funnels 1 are brought into the cathode ray tube manufacturer 19, the identification number specified by the two-dimensional matrix code 3 of each product is read by a reading device 15. Inherent information (for example the type, the transmittance, data on the position of pins and thickness and so on) of the glass bulbs, which is necessary for the cathode ray tube manufacturer, is extracted in response to the identification number, among information stored in the host computer 16. These data are recorded in floppy disks 17, and the glass bulb s are supplied along with the floppy disks 17 to the cathode ray tube manufacturer 19.

The cathode ray tube manufacturer 19 extracts information necessary for administration of control based on the information in the floppy disks and makes such information correspondent with the identification number of the two-dimensional matrix code of the glass bulbs by a host computer 18. Then, the panels 5 or the funnels 1 are subjected to administration for manufacturing by exchanging-information necessary for controlling by the host computer 18 in accordance with the two-dimensional matrix code 3 read in the reading device 20 in every occasion. Any means for transmitting information may be used instead of the floppy disk 17, for example, necessary information can be supplied through a network.

There is another way of administrating the manufacture of the glass bulbs in the cathode ray tube manufacturer 19. When the panels 5 or the funnels 1 with the two-dimensional matrix code 3 are received by the cathode ray tube manufacturer 19, the content of the two-dimensional matrix code 3 is mechanically read by the reading device 20. The host computer 18 checks information necessary for administration for manufacturing in the cathode ray tube manufacturer so that the panels or the funnels are specified so as to correspond to the read information. In manufacturing steps for cathode ray tubes in the cathode ray tube manufacturer, information necessary for controlling is taken through the host computer 18 on the basis of the two-dimensional matrix code 3 read by the reading device 20, and every step of the manufacturing is controlled by suitable information.

According to the present invention, information or data on a glass bulb are marked in a glass bulb by means of a two-dimensional matrix code comprised of a plurality of dots wherein each of the dots is in a form of recess having predetermined depth and diameter, whereby the two-dimensional matrix code can correctly be marked by laser and can be read by a pick-up device. As a result, a glass bulb manufacturer and a cathode ray tube manufacturer can use commonly the information marked by the two-dimensional matrix code. Accordingly, efficiency of manufacturing can be increased, flexibility for manufacturing in each of the manufacturers can be expanded, and the reduction of manufacturing cost and the improvement of yield can be expected.

Because of marking by laser, the marking by a relatively expensive sand-blasting method which was conventionally used by glass bulb manufacturers becomes unnecessary. On the other hand, it is unnecessary for cathode ray tube manufacturers to attach an expensive heat-resistant label or the like.

Further, by incorporating a serial information of glass bulb in the two-dimensional matrix code, both the manufacturers can have commonly the serial information which can be related to information necessary for each of the manufacturers in their computers when they use the information for manufacturing. As a result, it is possible to supply, by means of floppy disks, the data of glass bulbs specified by two-dimensional matrix codes from glass bulb manufacturers to cathode ray tube manufacturers. Accordingly, operations for preparing and inputting the marking which have been conducted by the cathode ray tube manufacturers can be omitted.

Further, the glass bulb manufacturers or the cathode ray tube manufacturers can easily confirm the history of each glass bulb based on the serial information by operating the host computers. Accordingly, when any trouble takes place, the cause of the trouble can quickly be obtained in comparison with the conventional method, and the yield of manufacturing can be improved.

What is claimed is:

1. A method for producing a cathode ray tube which comprises:

a step of reading a two-dimensional matrix code composed of a plurality of dots including at least a serial information marked in a predetermined portion of an outer side surface of a component for a cathode ray tube to identify individually the component for the cathode ray tube;

a step of determining by a control device operating conditions in response to the identified component for the cathode ray tube;

a step of reading the serial information in a manufacturing step for cathode ray tubes to extract desirable operating conditions determined for the component for the cathode ray tube from the control device; and a step of conducting operations instructed by the control device, wherein a part or all of the manufacturing steps are controlled on the basis of the serial information.

2. The method for producing the cathode ray tube according to claim 1, wherein the component for the cathode ray tube is at least one of a panel and a funnel of a color cathode ray tube.

3. The method for producing the cathode ray tube according to claim 1, wherein in the plurality of dots each dot has a recess depth of 5–100 $\mu$m and a diameter of 50–400 $\mu$m.

4. The method for producing the cathode ray tube according to claim 1, wherein the control device includes a computer.

5. The method for producing the cathode ray tube according to claim 1, wherein the operating conditions of the component identified based on the serial information are determined on the basis of the inherent information of the component provided from a component manufacturer by means of the two-dimensional matrix code or a memory medium or through a communication line, and the determined conditions are received in the control device.

6. The method for producing the cathode ray tube according to claim 1, wherein the two-dimensional matrix code is marked by laser.

7. The method for producing the cathode ray tube according to claim 1, wherein the component is a glass tube.

* * * * *